US011304547B2

(12) United States Patent
Hammond (10) Patent No.: US 11,304,547 B2
(45) Date of Patent: *Apr. 19, 2022

(54) APPARATUS AND METHOD FOR HANGING A PICTURE

(71) Applicant: Shari Michelle Hammond, Georgetown, TX (US)

(72) Inventor: Shari Michelle Hammond, Georgetown, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/518,803

(22) Filed: Nov. 4, 2021

(65) Prior Publication Data

US 2022/0053951 A1 Feb. 24, 2022

Related U.S. Application Data

(63) Continuation of application No. 16/836,973, filed on Apr. 1, 2020.

(60) Provisional application No. 62/842,078, filed on May 2, 2019.

(51) Int. Cl.
| | |
|---|---|
| *A47G 1/17* | (2006.01) |
| *A47G 1/20* | (2006.01) |
| *G01C 9/28* | (2006.01) |
| *G01C 9/34* | (2006.01) |
| *B25D 5/00* | (2006.01) |

(52) U.S. Cl.
CPC ............... *A47G 1/17* (2013.01); *A47G 1/20* (2013.01); *B25D 5/00* (2013.01); *G01C 9/28* (2013.01); *G01C 9/34* (2013.01)

(58) Field of Classification Search
CPC ..... A47G 1/17; A47G 1/20; B25D 5/00; G01C 9/28; G01C 9/34
See application file for complete search history.

(56) References Cited

U.S. PATENT DOCUMENTS

| | | | | | |
|---|---|---|---|---|---|
| 4,220,309 | A | * | 9/1980 | Eisen ............... | A47G 1/205 248/467 |
| 5,129,154 | A | * | 7/1992 | Aydelott ........... | A47G 1/205 248/542 |
| 5,180,135 | A | * | 1/1993 | Hindall ............ | A47G 1/205 248/475.1 |
| 5,398,906 | A | * | 3/1995 | Aydelott ........... | A47G 1/205 248/477 |
| 5,605,313 | A | * | 2/1997 | Erickson .......... | A47G 1/1606 248/467 |
| 6,000,142 | A | * | 12/1999 | Deaton ............. | A47G 1/205 33/613 |

(Continued)

*Primary Examiner* — Nimeshkumar D Patel
*Assistant Examiner* — Tania Courson
(74) *Attorney, Agent, or Firm* — G. Michael Roebuck; Moster Craft, LLC (57) ABSTRACT

An apparatus and method are disclosed having a key having a punch pin and a flat magnet keeps the punch pin in place in a metal v-notch hanger on a back side of a picture frame while a user levels a top edge of the picture frame to mark nail locations. A deck, a turret mounted on a top end of the deck, wherein the turret protrudes from the top end of the deck and the turret is gripped by a user as a handle while hanging a picture on a wall using the apparatus; a hook hanger attached to the front side of the deck for hanging a picture frame from a wire on a back of the picture frame; and a hole through the deck for aligning a push pin to pass through the hole and mark a location for an anchor from which the picture frame hangs.

10 Claims, 11 Drawing Sheets

(56) References Cited

U.S. PATENT DOCUMENTS

| | | | | |
|---|---|---|---|---|
| 6,739,065 B2 * | 5/2004 | Hofmeister | | A47G 1/205 33/451 |
| 6,952,887 B2 * | 10/2005 | Muchnik | | A47G 1/205 33/613 |
| 6,971,184 B2 * | 12/2005 | Prevost | | A47G 1/205 33/577 |
| 6,978,551 B2 * | 12/2005 | Krake | | A47G 1/205 33/613 |
| 7,234,245 B2 * | 6/2007 | Tatum | | B25H 7/045 33/613 |
| 7,275,334 B2 * | 10/2007 | Horst | | A47G 1/205 248/467 |
| 7,836,604 B2 * | 11/2010 | Paharik | | A47G 1/205 33/613 |
| 7,891,616 B2 * | 2/2011 | Pinchuk | | A47G 1/162 248/206.5 |
| 8,898,945 B2 * | 12/2014 | Miller | | A47G 1/162 40/713 |
| 9,095,976 B1 * | 8/2015 | Schoenebeck | | B25H 7/00 |
| 9,826,845 B2 * | 11/2017 | Krake | | A47G 1/1606 |
| D818,801 S * | 5/2018 | Ng | | D8/354 |
| 10,047,903 B2 * | 8/2018 | Bruno | | B25C 3/008 |
| 10,632,608 B1 * | 4/2020 | Peeples, III | | B25H 7/045 |
| 10,687,638 B1 * | 6/2020 | Ghofranian | | A47G 1/205 |
| D895,455 S * | 9/2020 | Hammond | | D10/69 |
| D938,244 S * | 12/2021 | Zhan | | D8/14 |
| 11,191,373 B2 * | 12/2021 | Ng | | A47G 1/1606 |
| 2006/0196069 A1 * | 9/2006 | Groepper | | A47G 1/205 33/613 |
| 2007/0186384 A1 * | 8/2007 | Broehl | | A47G 1/1613 16/355 |
| 2009/0224116 A1 * | 9/2009 | Gallien | | A47G 1/205 248/205.3 |
| 2020/0345158 A1 * | 11/2020 | Hammond | | G01C 9/28 |

* cited by examiner

PRIOR ART

APPARATUS AND METHOD FOR HANGING A PICTURE

CROSS REFERENCE TO RELATED APPLICATIONS

The patent application claims priority from U.S. Provisional Patent Application 62/842,078 filed on May 2, 2019 by and entitled Hand-Held Picture Hanging and Leveling Tool, which is hereby incorporated by reference in its entirety. The patent application also claims priority from U.S. patent application Ser. No. 16/836,973 filed on Apr. 1, 2020 by and entitled An Apparatus and Method for Hanging a Picture, which is hereby incorporated by reference in its entirety.

BACKGROUND OF THE INVENTION

The two most commonly used methods to hang pictures are a flexible wire and a fixed V hook with a headed wall anchor or screw attached to the wall. Often times multiple attempts are required to measure and locate a proper or desired location for a wall anchor or screw from which to hang a picture so that the picture ends up in the desired location after hanging from the screw or wall anchor.

FIELD OF THE INVENTION

The present invention is related to wall picture hangers.

BRIEF DESCRIPTION OF THE DRAWINGS

The invention will be better understood in reference to the following drawings, which are examples of an illustrative embodiment and are not limiting as different embodiments of the invention may be realized.

SUMMARY OF THE INVENTION

An apparatus and method are disclosed having a key having a punch pin and a flat magnet keeps the punch pin in place in a metal v-notch hanger on a back side of a picture frame while a user levels a top edge of the picture frame to mark nail locations. A deck, a turret mounted on a top end of the deck, wherein the turret protrudes from the top end of the deck and the turret is gripped by a user as a handle while hanging a picture on a wall using the apparatus; a hook hanger attached to the front side of the deck for hanging a picture frame from a wire on a back of the picture frame; and a hole through the deck for aligning a push pin to pass through the hole and mark a location for an anchor from which the picture frame hangs.

DETAILED DESCRIPTION OF THE INVENTION

The two most commonly used ways to hang pictures (including but not limited to framed pictures) are a flexible wire attached to a back of a picture and a fixed V hook attached to a back of a picture frame with a headed wall anchor or screw attached to the wall. In the flexible wire the ends of a woven wire are attached to the back side of a picture frame and then the midpoint of the slack wire is hung over a wall anchor or screw. When using a fixed V hook, a fixed hanger containing a horizontal V notch is rigidly attached to the backside of a frame. A mounting screw is anchored in the wall with the head left protruding ¼ inch from the wall. The frame is hung by simply lowering the protruding screw head into the V-hanger notch.

The age-old problem with both of these methods is that the picture hides where the wall anchoring screws should be positioned. The wall screw placement can be mathematically calculated but most of the time it is positioned by trial and error, leaving frequent frustration and several extra holes in the wall.

Disclosed herein, is an apparatus and method that enables quick and easy picture hanging using either a hanging wire or the V-notch hanger. With either the hanging wire or V-notch hanger, the disclosed apparatus and method accurately marks a correct position of the wall anchoring screws by providing a marking means that is actuated by manually pressing the frame against the wall when the picture is properly located in a desired location. The marking mechanism is actuated by pushing on the top two corners of the frame leaving small indentations for locating the wall screws.

Figure 1:
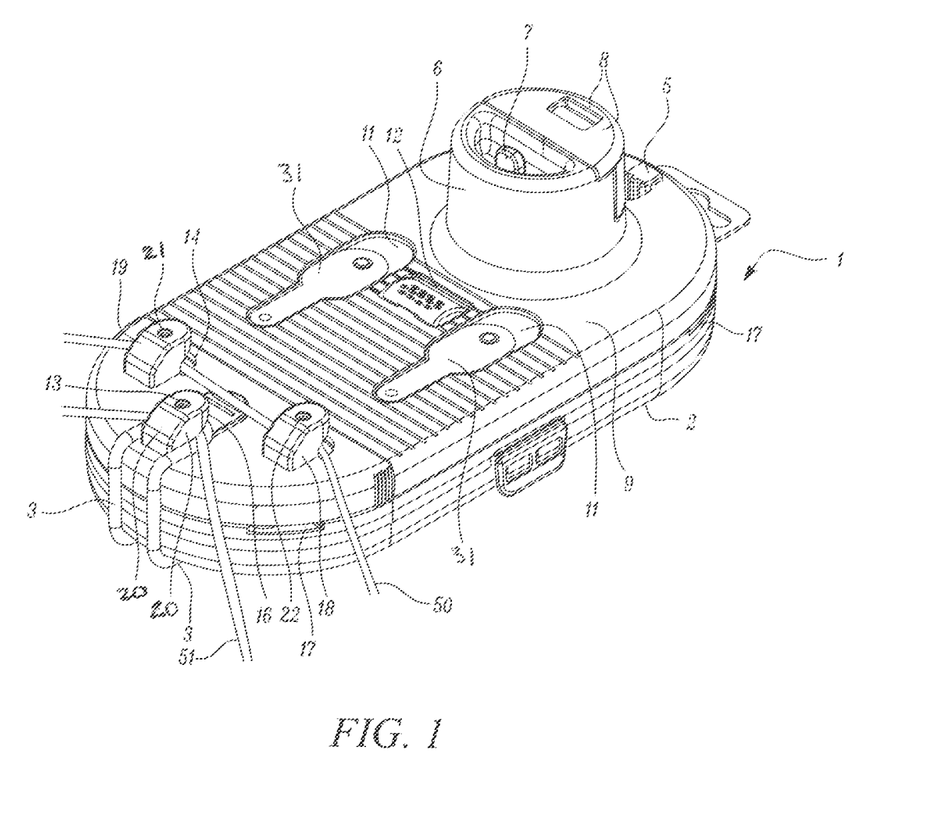
FIG. 1 is an isometric drawing showing a top side of a particular illustrative embodiment of the invention depicting a picture-hanging-picture hanging tool.

Turning now to FIG. 1, FIG. 1 is an isometric depiction of a particular illustrative embodiment of the invention, showing a top side of a picture-hanging-picture hanging tool generally designated as numeral 1. Picture hanging tool 1 provides a method for locating a position of a wall anchor, screw or nail for the desired positioning of a picture frame without calculating or measuring. The terms picture and picture frame are used interchangeable herein to indicate a picture that is framed or unframed.

Figure 2:
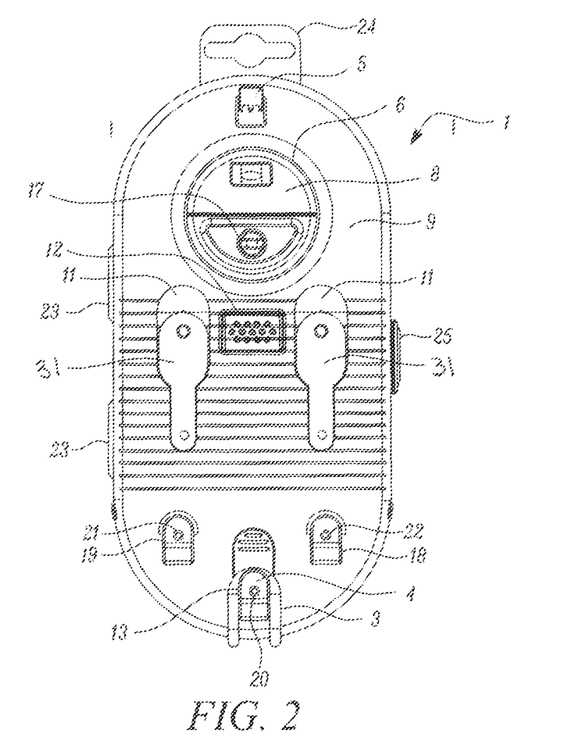
FIG. 2 is a top orthogonal view of a particular illustrative embodiment of the invention depicting a picture-hanging-picture hanging tool.
Figure 3:
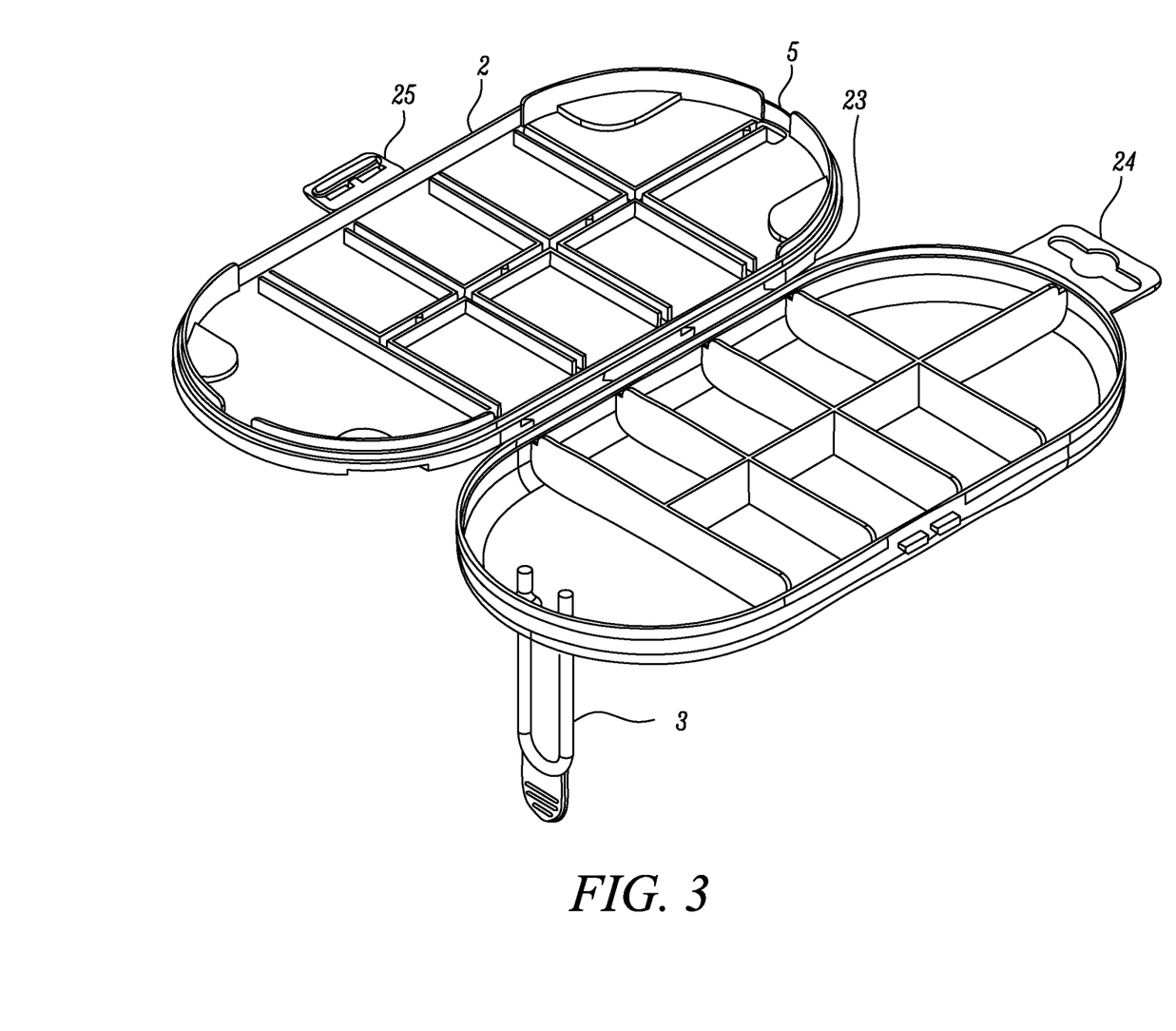
FIG. 3 shows a picture hanging hardware storage box that has been removed from the back of a particular illustrative embodiment of the invention depicting a picture-hanging-picture hanging tool and then opened.

FIG. 2 is a top orthogonal view of a depiction of a picture hanging picture hanging tool 1. FIG. 3 depicts a picture hanging hardware storage box that has been removed from the back of picture hanging tool 1 and then opened. Elastic band 3 and latch 5 control separation of the storage box 2 from picture hanging tool 1. Storage box 2 is easily removed from picture hanging tool 1 by first lifting elastic O-ring 3 off hook 4 then pivoting picture hanging tool 1 up and off of rear latch 5. Storage box 2 has a plastic living hinge 23, latch 25 and hang tab 24. It has multiple compartments for storing picture hanging hardware.

Figure 4:
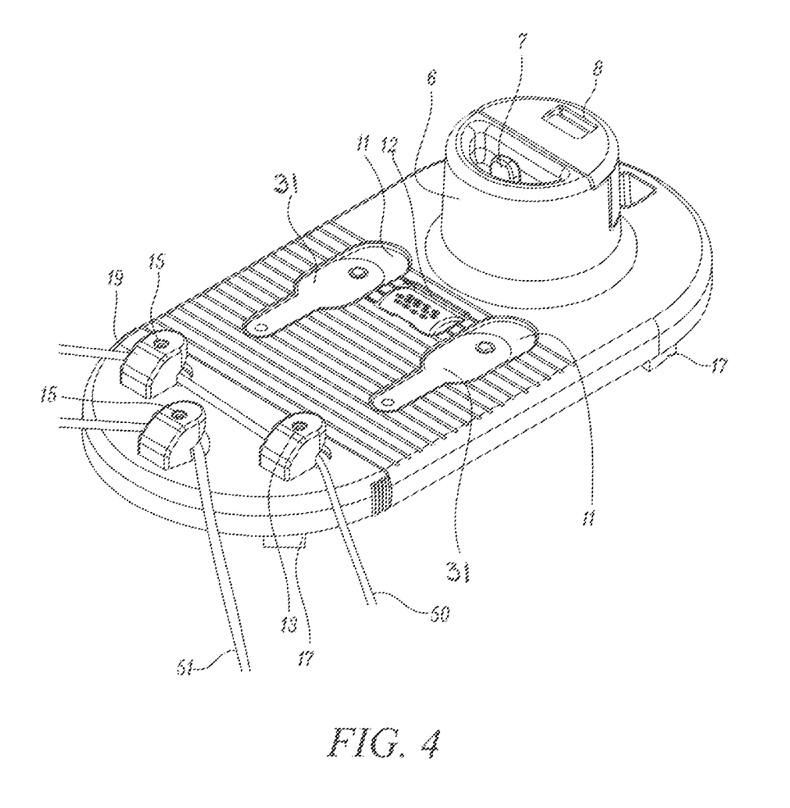
FIG. 4 is an isometric top view of a particular illustrative embodiment of the invention depicting a picture-hanging-picture hanging tool without the storage box.
Figure 5:
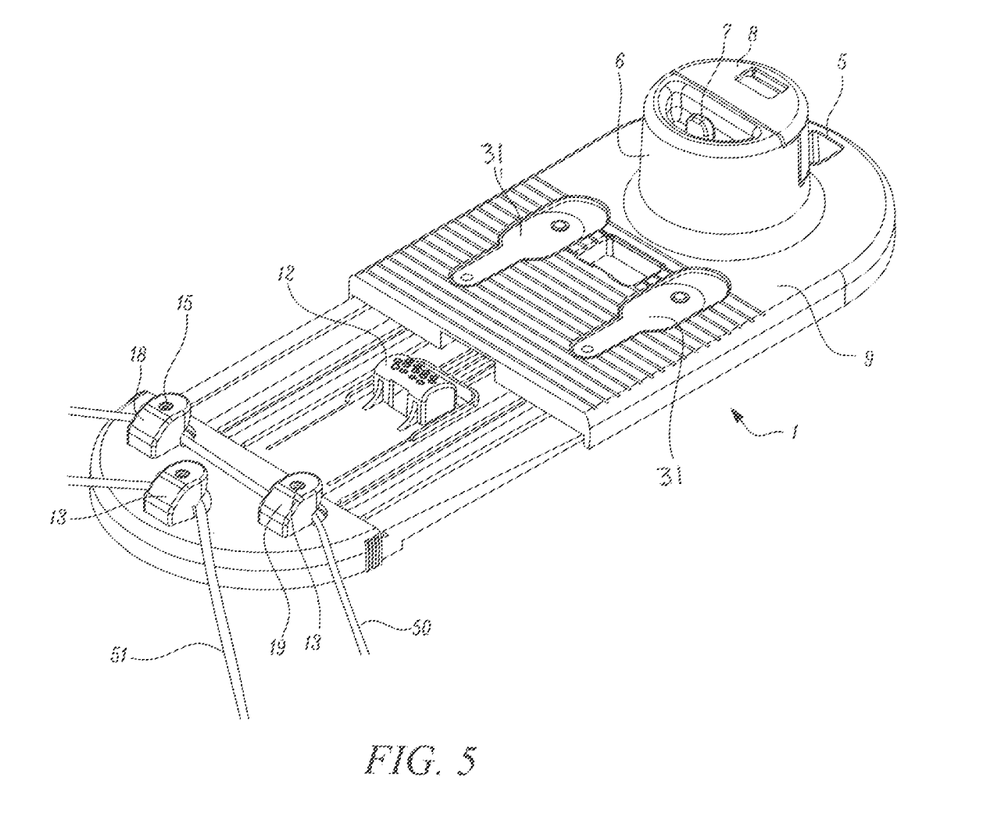
FIG. 5 is an isometric top side view of a particular illustrative embodiment of the invention depicting a picture-hanging-picture hanging tool without storage box.

FIG. 4 is an isometric top view of the picture hanging tool 1 without the storage box 2. FIG. 5 is an isometric top side view of the picture hanging tool 1 without storage box 2. It also shows picture hanging tool 1 in an extended position which is used when hanging a larger picture using woven cable. In a middle of deck 9 there is a latched push button 12 whose function is to keep the unit compact until it is extended. This extension ensures that the turret 6 will stay above the top of the picture frame 10 during hanging so that the turret can be gripped by a person using the picture during hanging a picture using the picture hanging tool 1.

Figure 6:
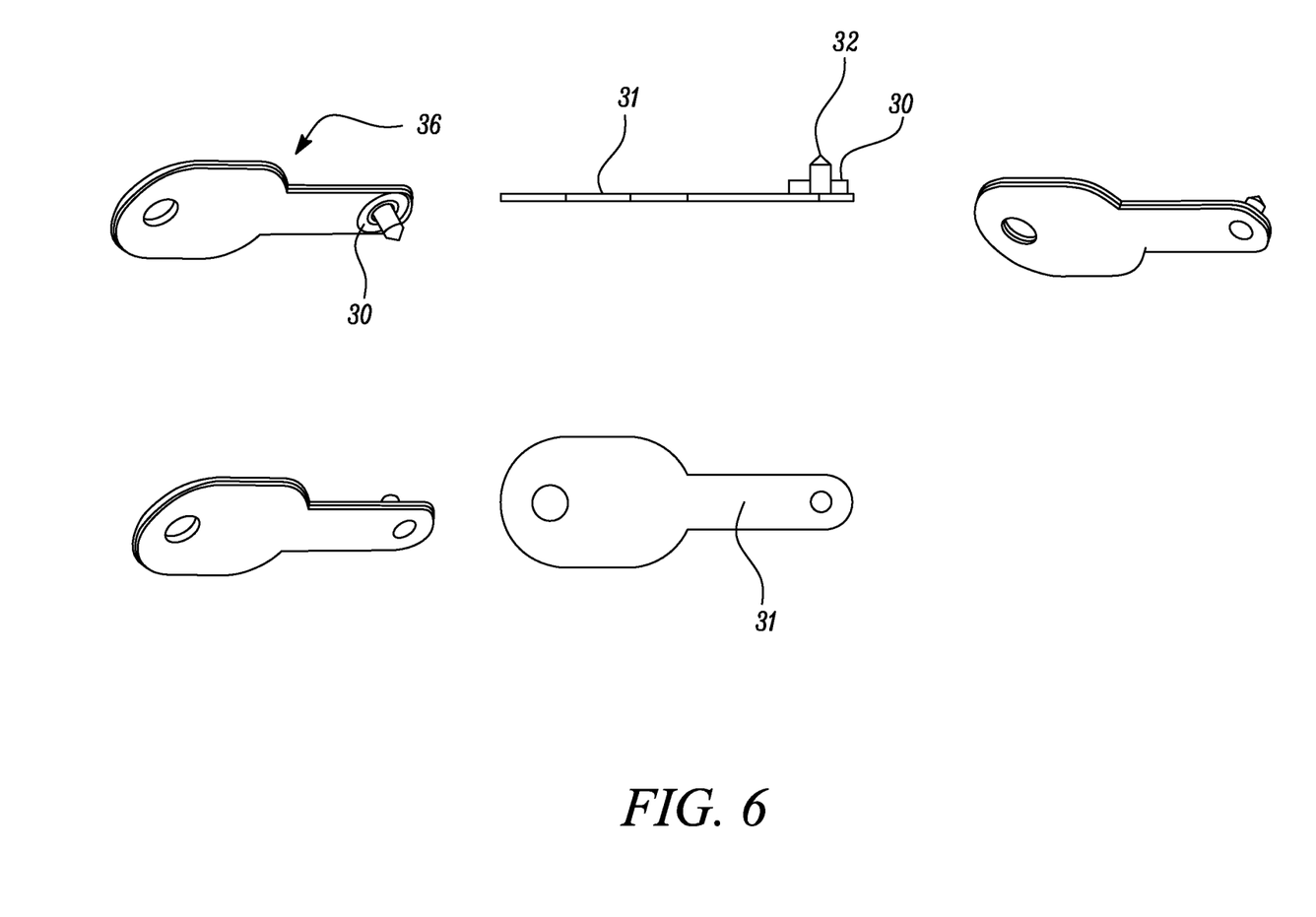
FIG. 6 shows isometric, top and front views of a flat key with an attached magnet and a sharp punch pin in a particular illustrative embodiment of the invention depicting a picture-hanging-picture hanging tool.
Figure 7:
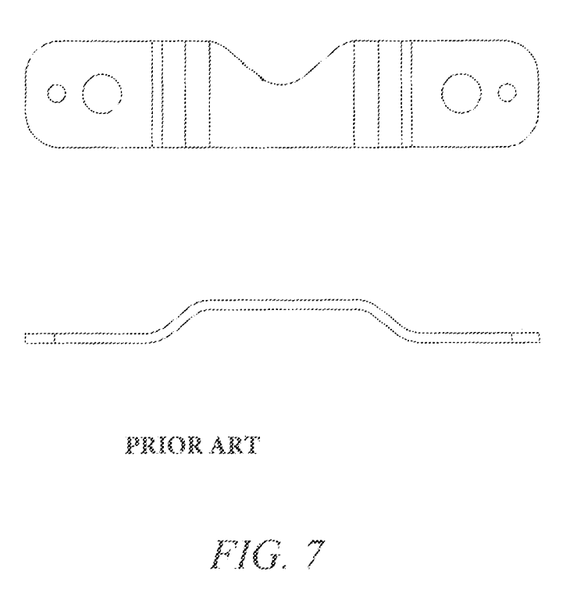
FIG. 7 shows isometric, top and front views of a disclosed V-hanger a particular illustrative embodiment of the invention.

FIG. 6 shows isometric, top and front views of a flat key 31 with an attached ring magnet 30 and a sharp punch pin 32. FIG. 7 shows isometric, top and front views of the disclosed V-hanger.

Figure 8:
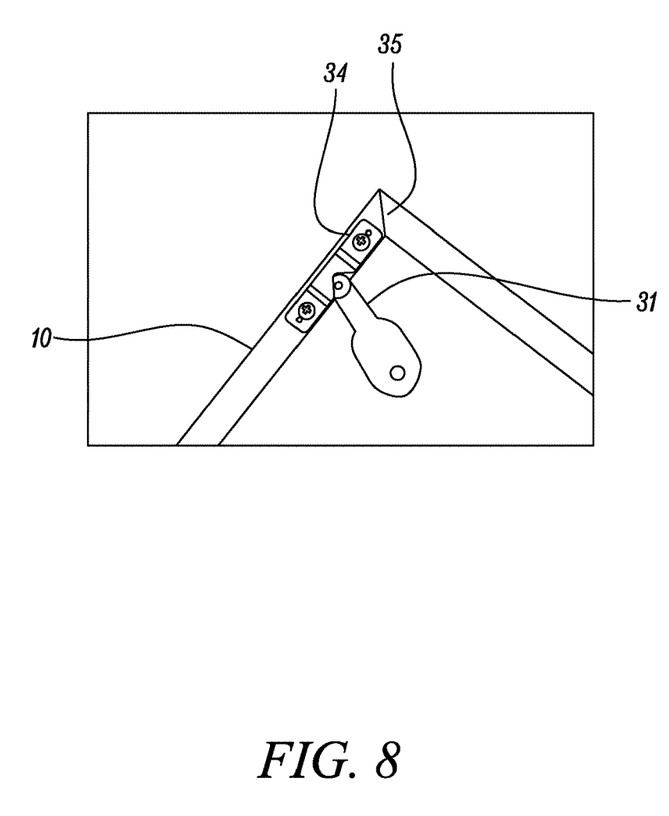
FIG. 8 and FIG. 9 show a pictorial view of how a key is installed in the V-notch hanger in a particular illustrative embodiment of the invention depicting a picture-hanging-picture hanging tool.
Figure 9:
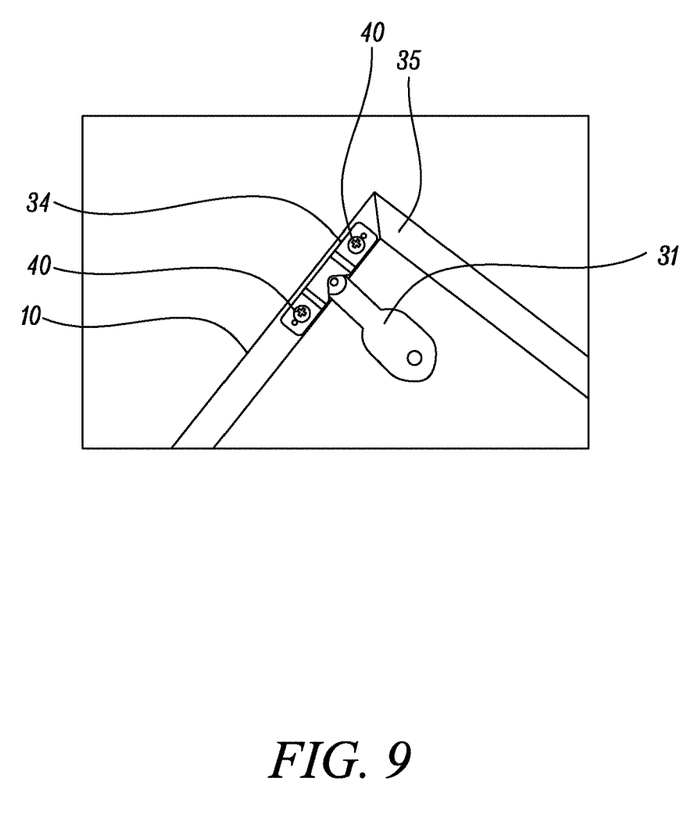

FIG. 8 and FIG. 9 depict a pictorial view of how a key is installed in the V-notch hanger. Two deep V-notch hangers 33 and 34 are screwed on the back side of the frame. The hanger installation does not require any measuring of the picture to calculate a position for a nail or screw in the wall from which to hang the picture. A V-notch hanger 34 is screwed on the top left side and another V-notch hanger 34 on the top right side. The large V notch in the hanger is pointed upward with the rest of the installation being positioned by sight, and then screwed or nailed onto the picture.

FIG. 8 shows key 31 with the ring magnet and sharp punch pin 32 being slid up the V notch side until seated as shown in FIG. 9, the sharp punch pin 32 is bottomed out in the V notch. This sawtooth procedure is repeated on the left side.

Figure 10:
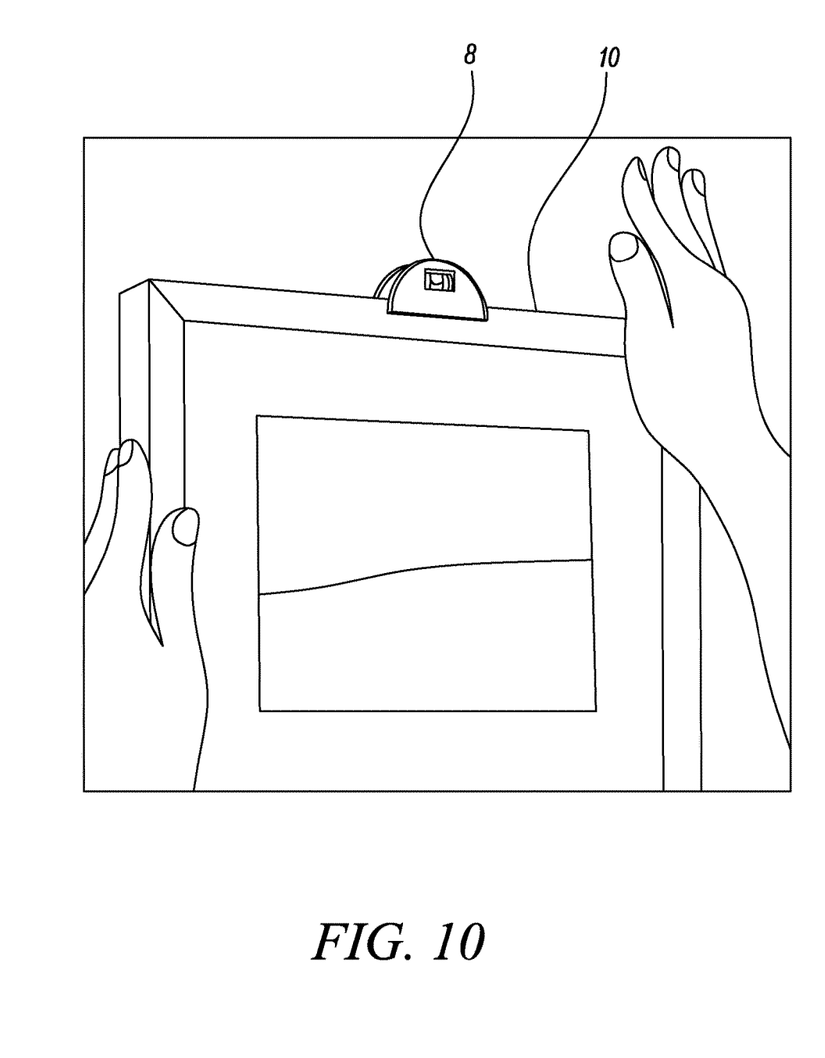
FIG. 10 shows the operator placing bubble level on top of the frame.

FIG. 10 shows the operator placing the bubble level 8 on top of a picture frame. With the bubble level enabling the user to keep the top frame horizontal, the user manually positions the picture frame 10. Now the user moves their left hand up to the top-left corner of the picture frame and pushes in on the picture frame and toward the wall. The user pushing in on the picture frames drives the sharp punch pin 32 into the wall making a mark for a location for a nail or wall anchor. Now with the right hand, the user pushes the right top corner of the picture frame toward the wall, driving the other punch pin into the wall. These marks made by pushing the punch pin into the wall are used to align a nail, screw or a more sophisticated hanger leaving the picture and frame perfectly positioned on the wall. A multiple function turret 6 protrudes from deck 9. Turret 6 serves as a handle that sticks out above picture frame so that the user can visually move picture frame 10 (FIG. 9) to desired location. Push center release latched push button 12 to expand picture hanging tool 1 for wire-hanging large pictures. Expanding the picture hanging tool allows the handle turret 6 to be accessible outside the picture frame area.

Figure 11:
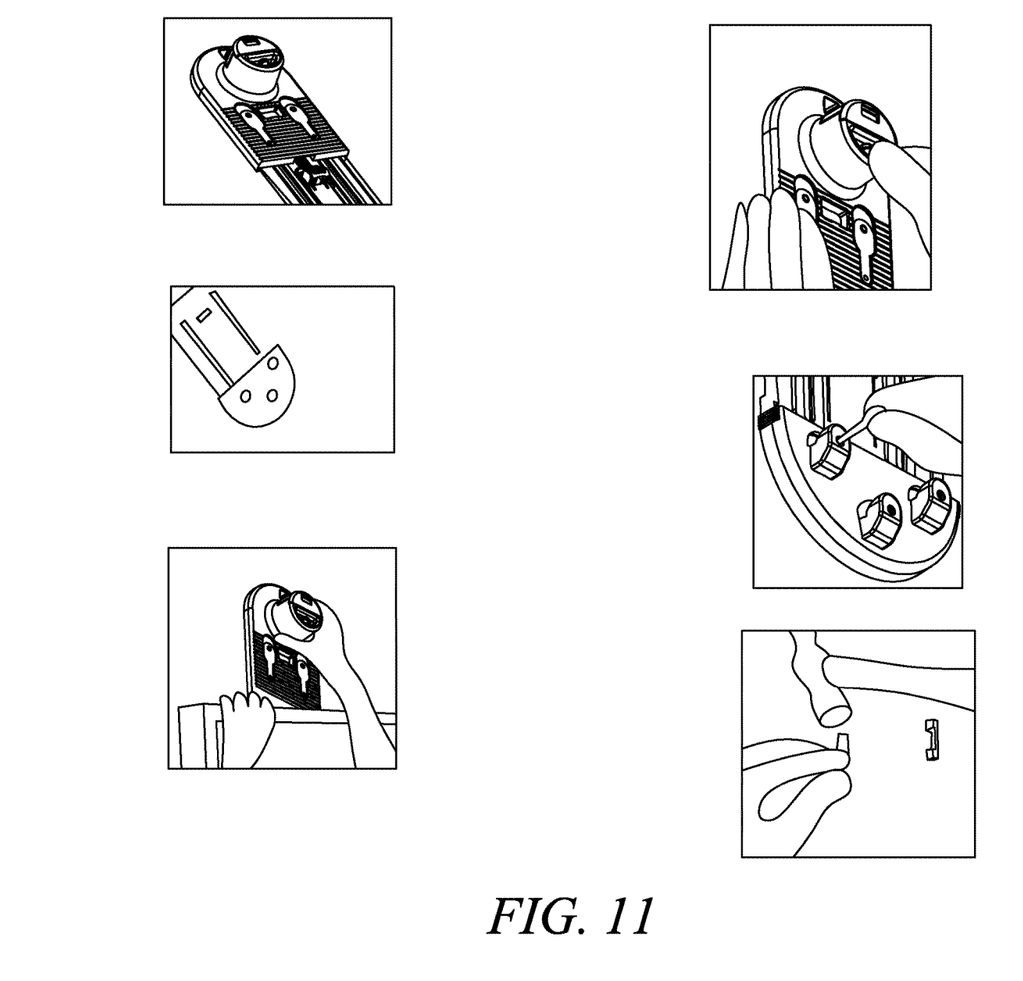
FIGS. 11 and 12 depicts a person using different particular illustrative embodiments of the invention.
Figure 12:
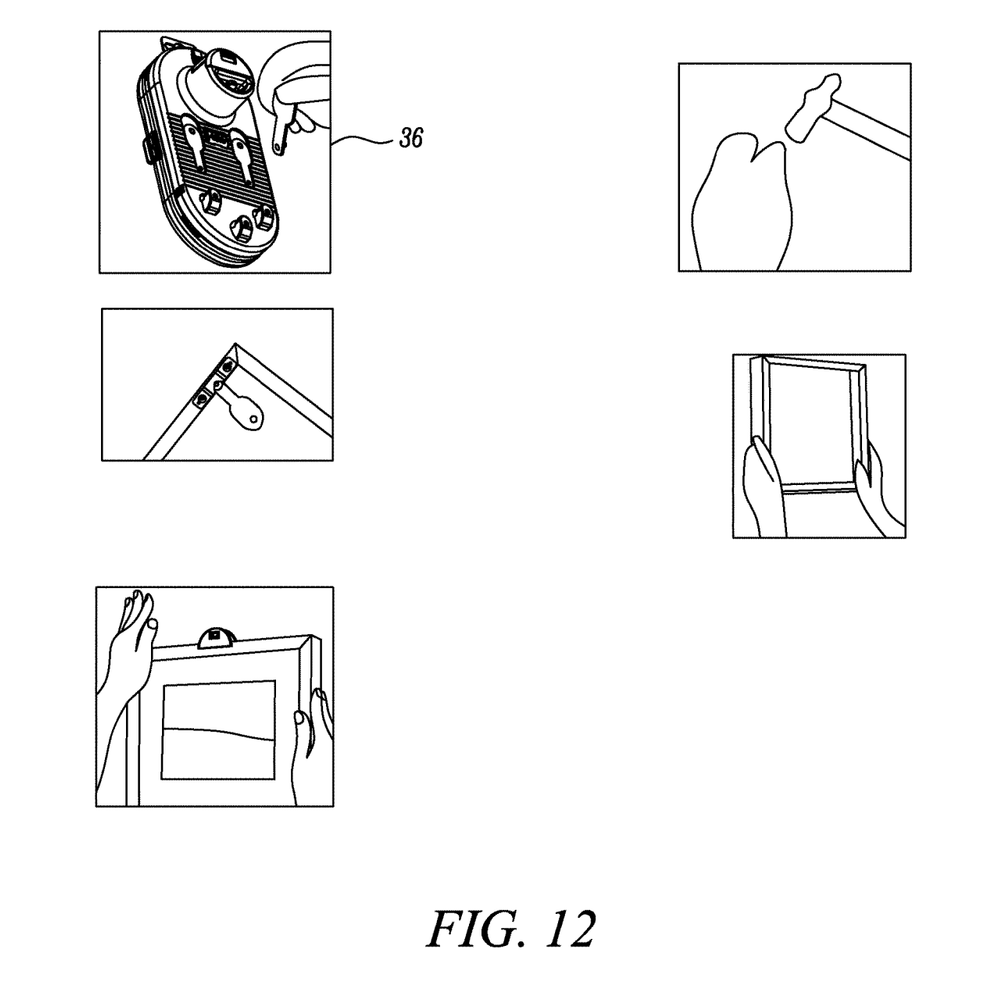

FIGS. 11 and 12 depicts a person using different particular illustrative embodiments of the invention.

The tool stores push-pin 7 which will be used later to mark the wall position of the anchor that hangs picture wire 50. A third function of the turret is to house removable bubble level 8. Level 8 sets on top of the picture frame when positioning the frame so the picture can be leveled. Also, on deck 9 of picture hanging tool 1 there are two key-like depressions 11 that store two magnetic keys 31 whose function will be explained later. Picture hanging tool 1 magnetically retains keys 31 in the two like depressions 11.

There are 4 high friction feet 17 which grip the wall and take much of the vertical load when positioning the frame. There are two commonly used ways to hang pictures. Historically most pictures were hung by using the flexible wire method, see FIG. 11. In FIG. 1, there are three frog-like hooks 18, 19 and 20 for attaching the picture hanging wire 50 or 51. Two side hooks 18 and 19 used together are recommended to support large, heavy picture hanging using wire 50. The double hook procedure will result in the picture hanging wire 50 being supported at two places making it significantly stronger and less likely to tilt than a single hook method. If the picture is small and lightweight the single hook method may be appropriate. When using a single hook, hook 20 alone is used to hang on wire 51.

After the picture is positioned and leveled using level 8, push pin 7 is manually removed from turret 6 and inserted through holes 21 and 22 for the double hook hanger or inserted through hole 13 for the single hook 20 hanger. This will mark the wall for positioning the picture using a nail, screw or hanging hooks.

As shown in FIG. 3, to hang pictures using a Wire Hanger, a person hanging a picture removes the bubble level 8 from the turret 6 and places the bubble level 8 on a top of the picture frame. Picture hanging wire 50 over the hooks near the bottom of the picture hanging tool. For light pictures, use the lower, center hook 20. For heavier pictures, use the two side hooks 18 and 19.

A user then lifts and positions the picture on the wall while the picture is suspended from picture hanging wire 50. When frame is level and accurately set, the user removes the picture from the picture hanging tool while keeping picture hanging tool 1 in position against the wall. The user applies a medium amount of pressure on the picture hanging tool and to the high friction feet 17 to prevent the picture hanging tool from moving from its position on the wall. With the picture hanging tool 1 pressed firmly against the wall, the user removes the push-pin 7 from its home in turret 6 and then inserts the push pin 7 into the single hole 13 or if using the dual hooks push pin 7 is inserted in both holes 21 and 22. Press pin 7 firmly into the wall to mark the holes needed to hang your picture. The user then lowers picture hanging tool 1 and finds the marked holes which are visible on the wall. The user then selects an appropriate nail and a metal hook from the hardware case 2 and hammers a selected nail or metal hook into the wall. Now the user can hang the wire-hanging picture. While hanging the picture on a nail is often the simplest installation, there are a multitude of dry-wall hooks and screws on the market for hanging heavier frames that can also be used.

To hang pictures FIG. 12 using either generic sawtooth hangers or the disclosed V-Notched Hangers, the user opens and retrieves picture hanging hardware by unlatching the silicone rubber band 3 then separates the storage box 2 from hanging picture hanging tool 1. The user then selects two disclosed V-tooth hangers 70 and 71. Screw on one hanger at the top left of back of the frame with its large V pointed vertically. The other hanger should be installed at the top right of the frame with its large V pointed vertically.

The user removes the two magnetic keys 36 located on the front panel of picture hanging tool 1. Each key has a ring magnet 30 and a sharp punch pin 32 protruding through marking the wall. When pressed by the user the wall punches 32 will mark the wall where the anchor screws should be located. Next, the user takes one of the two magnet keys 36 and insert the pointed stud into the V-notch on one of the saw-tooth hangers. A magnet wrapped around a pointed stud magnetically holds the key stud centered in the V. The user then repeats with the other key on the other side. The hangers do not have to be precisely located because the pointed stud is aligned by the deep V and protrudes outward toward the wall.

Next the user removes the bubble level 8 from turret 6 and places the bubble level on top of the frame. Facing the front of the frame, the user grasps the picture near the top of the picture with a hand on each side with their thumbs pressing inward. Next the user gently moves the picture around the wall until it is level and in the desired location. While holding the frame level, the user uses the heels of their hands and sharply presses the picture against the wall. This sharp force of the pressure on the picture marks the wall and accurately locates the hanging nail position.

The user then places the nail into the wall mark. For better strength, the user angles the nail down about 15 degrees then drives nail with a small hammer, leaving a head of the nail sticking out from the wall about ¼ inch. The user then removes and stores both key magnets before hanging the picture on the wall anchor screws. The user then hangs the V-tooth hangers on the two nail heads.

In a particular illustrative embodiment of the invention, an apparatus is disclosed including but not limited to a flat key having a first end and a second end; a punch pin, the punch pin having a sharp end and a flat end, wherein the flat end of the punch is attached to the first end of the key; and a flat magnet surrounding the flat end of the punch, wherein the flat magnet keeps the punch pin in place in a metal v-notch hanger on a back side of a picture frame while a user levels a top edge of the picture frame so that the top edge of the picture frame is parallel to horizontal while a user presses on a front side of the picture frame pressing the sharp end of the punch pin into a wall for marking hanger locations on the wall for hanging the picture frame so that the top of the picture frame is parallel to horizontal. In another particular illustrative embodiment of the invention, a punch pin is placed in a top of a notched groove of the V-notch hanger.

In another particular illustrative embodiment of the invention, the apparatus of claim 1, further includes but is not limited to a bubble level, wherein the bubble level is removable attached to the top end of the deck, wherein the bubble level is placed on a top surface of the picture frame for leveling the top surface of the picture frame with horizontal. In another particular illustrative embodiment of the invention, the apparatus of claim 1, further includes but is not limited to a storage compartment that contains the apparatus.

In another particular illustrative embodiment of the invention, a method is disclosed, the method including but not limited to pressing a deck against a wall, the deck having a front side, a back side, a top end and a bottom end; hanging a picture frame from a wire on a back of the picture frame on a hook hanger attached to the front side of the deck for hanging; supporting the deck and the picture frame from a turret mounted on a top end of the deck, wherein the turret protrudes from the top end of the deck and the turret is gripped by a user as a handle while hanging a picture on a wall using the apparatus; sticking a push pin through a hole through the deck for aligning a push pin; and marking a location for an anchor from which the picture frame hangs. In another particular illustrative embodiment of the invention, pressing the deck against the wall further includes but is not limited to pressing a plurality of friction feet attached to the back side of the deck, wherein the plurality of friction feet is pressed against the wall to support a vertical load of the weight of the picture frame hanging from the apparatus.

In another particular illustrative embodiment of the invention, the method further includes but is not limited to removing a bubble level removably attached to the top end of the deck; and leveling a top edge of the picture frame using the bubble level. In another particular illustrative embodiment of the invention, the method further includes but is not limited to increasing a distance between the top end and the bottom end of the deck wherein the deck has a top end and a bottom end and is extensible in length.

In another particular illustrative embodiment of the invention, in the method the deck is extensible between a top end of the deck having a turret and bottom end of the deck having the, the method further including but not limited to extending a distance between the turret and the hook hanger attached to the front side of the deck so that the turret extends beyond a top edge of the picture frame. In another particular illustrative embodiment of the invention, the method further includes but is not limited to keeping the deck compacted until the deck is extended using a push button attached to a point between the top end of the deck and the bottom end of the deck.

In another particular illustrative embodiment of the invention, an apparatus is disclosed that includes but is not limited a deck having a front side, a back side, a top end and a bottom end; a turret mounted on a top end of the deck, wherein the turret protrudes from the top end of the deck and the turret is gripped by a user as a handle while hanging a picture on a wall using the apparatus; a hook hanger attached to the front side of the deck for hanging a picture frame from a wire on a back of the picture frame; and a hole through the deck for aligning a push pin to pass through the hole and mark a location for an anchor from which the picture frame hangs.

In another particular illustrative embodiment of the invention, an apparatus is disclosed that includes but is not limited a plurality of friction feet attached to the back side of the deck, wherein the plurality of friction feet is pressed against the wall to support a vertical load of the weight of the picture frame hanging from the apparatus. In another particular illustrative embodiment of the invention, an apparatus is disclosed that includes but is not limited a bubble level removably attached to the top end of the deck for leveling a top edge of the picture frame.

In another particular illustrative embodiment of the invention, in the apparatus the deck has a top end and a bottom end and is extensible in length, increasing a distance between the top end and the bottom end of the deck; a push button attached to a point between the top end of the deck and the bottom end of the deck, to keep the deck compacted until the deck is extended.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus comprising:
    a deck having a front side, a back side, a top end, and a bottom end;
    a turret mounted on a top end of the deck, wherein the turret protrudes from the top end of the deck and the turret is gripped by a user as a handle while hanging a picture on a wall using the apparatus;
    a hook attached to the front side of the deck for hanging a picture frame from a wire on a back of the picture frame;
    a hole through the deck for aligning a push pin to pass through the hole and mark a location for an anchor from which the picture frame hangs, wherein the deck has a top end and a bottom end and is extensible in length, increasing a distance between the top end and the bottom end of the deck;
    a push button attached to a point between the top end of the deck and the bottom end of the deck, to keep the deck compacted until the deck is extended;
    a flat key removably attached to the front side of the deck, wherein the flat key having a first end narrower and a second wider end;
    wherein the push pin is formed on the flat key, the punch pin having a sharp end and a flat end, wherein the flat end of the push pin is attached to the first end of the flat key; and
    a flat magnet surrounding the flat end of the push pin, removably attached to the front side of the deck, wherein the flat magnet keeps the push pin in place in a metal v-notch hanger on a back side of a picture frame while a user levels a top edge of the picture frame so that the top edge of the picture frame is parallel to horizontal while a user presses on a front side of the picture frame pressing the sharp end of the push pin into a wall for marking hanger locations on the wall for hanging the picture frame so that the top of the picture frame is parallel to horizontal.

2. The apparatus of claim 1, wherein the push pin is placed in a top of a notched groove of the V-notch hanger.

3. The apparatus of claim 1, wherein the deck is unslotted, the apparatus further comprising:
    a bubble level attached to the turret, wherein the bubble level is removable attached to the top end of the turret, wherein the bubble level is placed on a top surface of the picture frame for leveling the top surface of the picture frame with horizontal.

4. The apparatus of claim 1, the apparatus further comprising:
    a storage compartment that contains the apparatus.

5. A method, the method comprising:
    pressing a deck against a wall, the deck having a front side, a back side, a top end, and a bottom end;
    hanging a picture frame from a wire on a back of the picture frame on a hook attached to the front side of the deck for hanging;
    supporting the deck and the picture frame from a turret mounted on a top end of the deck, wherein the turret protrudes from the top end of the deck and the turret is gripped by a user as a handle while hanging a picture on a wall;
    sticking a push pin through a hole through the deck for aligning a push pin;
    marking a location for an anchor from which the picture frame hangs
    increasing a distance between the top end and the bottom end of the deck wherein the has a top end and a bottom end and is extensible in length,
    wherein the deck is extensible between a top end of the deck having the turret and bottom end of the deck, the method further comprising:
    extending a distance between the turret and the hook attached to the front side of the deck so that the turret extends beyond a top edge of the picture frame and
    keeping the deck compacted until the deck is extended using a push button attached to a point between the top end of the deck and the bottom end of the deck.

6. The method of claim 5, wherein pressing the deck against the wall further comprises:
    pressing a plurality of friction feet attached to the back side of the deck, wherein the plurality of friction feet is pressed against the wall to support a vertical load of a weight of the picture frame.

7. The method of claim 6, the apparatus further comprising:
    removing a bubble level removably attached to the top end of the deck; and
    leveling a top edge of the picture frame using the bubble level.

8. An apparatus comprising:
    a deck having a front side, a back side, a top end and a bottom end;
    a turret mounted on a top end of the deck, wherein the turret protrudes from the top end of the deck and the turret is gripped by a user as a handle while hanging a picture on a wall using the apparatus;
    a hook attached to the front side of the deck for hanging a picture frame from a wire on a back of the picture frame; and
    a hole through the deck for aligning a push pin to pass through the hole and mark a location for an anchor from which the picture frame hangs, wherein the deck has a top end and a bottom end and is extensible in length, increasing a distance between the top end and the bottom end of the deck; and a push button attached to a point between the top end of the deck and the bottom end of the deck, to keep the deck compacted until the deck is extended.

9. The apparatus of claim 8, the apparatus further comprising:
a plurality of friction feet attached to the back side of the deck, wherein the plurality of friction feet is pressed against the wall to support a vertical load of a weight of the picture frame hanging from the apparatus.

10. The apparatus of claim 8, the apparatus further comprising:
a bubble level removably attached to the top end of the deck for leveling a top edge of the picture frame.

* * * * *